(12) United States Patent
Wu et al.

(10) Patent No.: US 11,630,872 B2
(45) Date of Patent: Apr. 18, 2023

(54) INTERNET DATA COLLECTION METHOD

(71) Applicant: ASUSTEK COMPUTER INC., Taipei (TW)

(72) Inventors: Jau-Yi Wu, Taipei (TW); Sheng-Ta Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/308,815

(22) Filed: May 5, 2021

(65) Prior Publication Data

US 2021/0349951 A1 Nov. 11, 2021

(30) Foreign Application Priority Data

May 5, 2020 (TW) .................. 109114938

(51) Int. Cl.
*G06F 7/02* (2006.01)
*G06F 16/00* (2019.01)
*G06F 16/951* (2019.01)
*G06F 16/958* (2019.01)
*G06F 16/906* (2019.01)

(52) U.S. Cl.
CPC .......... *G06F 16/951* (2019.01); *G06F 16/906* (2019.01); *G06F 16/986* (2019.01)

(58) Field of Classification Search
CPC ..... G06F 16/951; G06F 16/906; G06F 16/986
See application file for complete search history.

(56) References Cited

U.S. PATENT DOCUMENTS

| | | | |
|---|---|---|---|
| 7,801,213 B2 | 9/2010 | Monta et al. | |
| 8,087,044 B2 | 12/2011 | Krause et al. | |
| 2011/0158605 A1* | 6/2011 | Bliss | H04N 21/4524 386/E5.003 |
| 2012/0191691 A1* | 7/2012 | Hansen | G06F 16/951 707/E17.108 |
| 2013/0080447 A1* | 3/2013 | Ramer | G06F 16/9535 707/748 |
| 2016/0350421 A1* | 12/2016 | Multerer | G06F 16/951 |
| 2017/0300574 A1* | 10/2017 | Maita | G06F 16/958 |
| 2017/0330598 A1 | 11/2017 | Choi et al. | |
| 2020/0380048 A1* | 12/2020 | Bhat | G06F 16/951 |

FOREIGN PATENT DOCUMENTS

| | | | | |
|---|---|---|---|---|
| CN | 101529346 B | | 5/2012 | |
| CN | 107330392 A | | 11/2017 | |
| CN | 107360444 A | | 11/2017 | |
| CN | 110704566 A | * | 1/2020 | ............. G06F 16/29 |

\* cited by examiner

*Primary Examiner* — Bruce M Moser
(74) *Attorney, Agent, or Firm* — Muncy, Geissler, Olds & Lowe, P.C.

(57) ABSTRACT

An internet data collection method includes steps of receiving a collecting instruction, the collecting instruction corresponds to target data that marked on a web page; retrieving a web address corresponding to the web page and the location information of the target data on the web page; and storing the web address and the location information as a tag to an operating end.

11 Claims, 8 Drawing Sheets

```
┌────────────────────────────────────────────┐
│ receive a collecting instruction, the      │
│ collecting instruction corresponds to      │──S120
│ target data marked on a web page           │
└────────────────────────────────────────────┘
                     │
                     ▼
┌────────────────────────────────────────────┐
│ acquire a web address corresponding to the │
│ web page and the location information of   │──S140
│ the target data on the web page            │
└────────────────────────────────────────────┘
                     │
                     ▼
┌────────────────────────────────────────────┐
│ store the web address and the location     │──S160
│ information as a tag to the operating end  │
└────────────────────────────────────────────┘
```

INTERNET DATA COLLECTION METHOD

CROSS-REFERENCE TO RELATED APPLICATION

This application claims the priority benefit of Taiwan applications serial No. 109114938, filed on May 5, 2020. The entirety of the above-mentioned patent application is hereby incorporated by reference herein and made a part of specification.

BACKGROUND OF THE INVENTION

Field of the Invention

The disclosure relates to a data collection method and, more particularly, to an internet data collection method.

Description of the Related Art

With the development of the Internet, more and more information can be obtained through the internet, and the internet has become the main source for many people to obtain or collect information.

The traditional internet data collection method has the following disadvantages: (1) in order to collect internet data, users need to continuously perform copy and paste function through the browser application. After data collection is completed, users still need to classify the data; (2) with the diversification of internet data, users need to temporarily store such data by different file types in order to collect and access internet data in different formats; and (3) when the user is retrieving the web page data, he/she cannot retrieve the content of the access website or the page provided on the web page at the same time.

All of these will cause inconvenience for users in the process of collecting and classifying internet data.

BRIEF SUMMARY OF THE INVENTION

An internet data collection method is provided. The internet data collection method comprising: receiving a collecting instruction, the collecting instruction corresponds to target data marked on a web page; retrieving a web address corresponding to the web page and the location information of the target data on the web page; and storing the web address and the location information as a tag to an operating end.

Through the internet data collection method provided herein, users can directly label the target data and collect on the web page, and then automatically record and store them as a tag for users to collect and use. The internet data collection method provides a convenient way and interface for users to classify the data. Moreover, for data that is difficult to retrieve directly through the web page, such as the text of the web page or the text on the image that is restricted from copying, the editable format of the text is generated through screen capture and the text recognition way to facilitate users' collection and use.

These and other features, aspects and advantages of the present disclosure will become better understood with regard to the following description, appended claims, and accompanying drawings.

DETAILED DESCRIPTION OF THE EMBODIMENTS

The specific implementation will be described in more detail below in conjunction with the schematic diagram. According to the following description and the scope of claims, the advantages and features will be more clear. It should be noted that the drawings all adopt a very simplified form and all use imprecise proportions, which are only used to conveniently and clearly assist in explaining the purpose of the embodiments.

Figure 1:
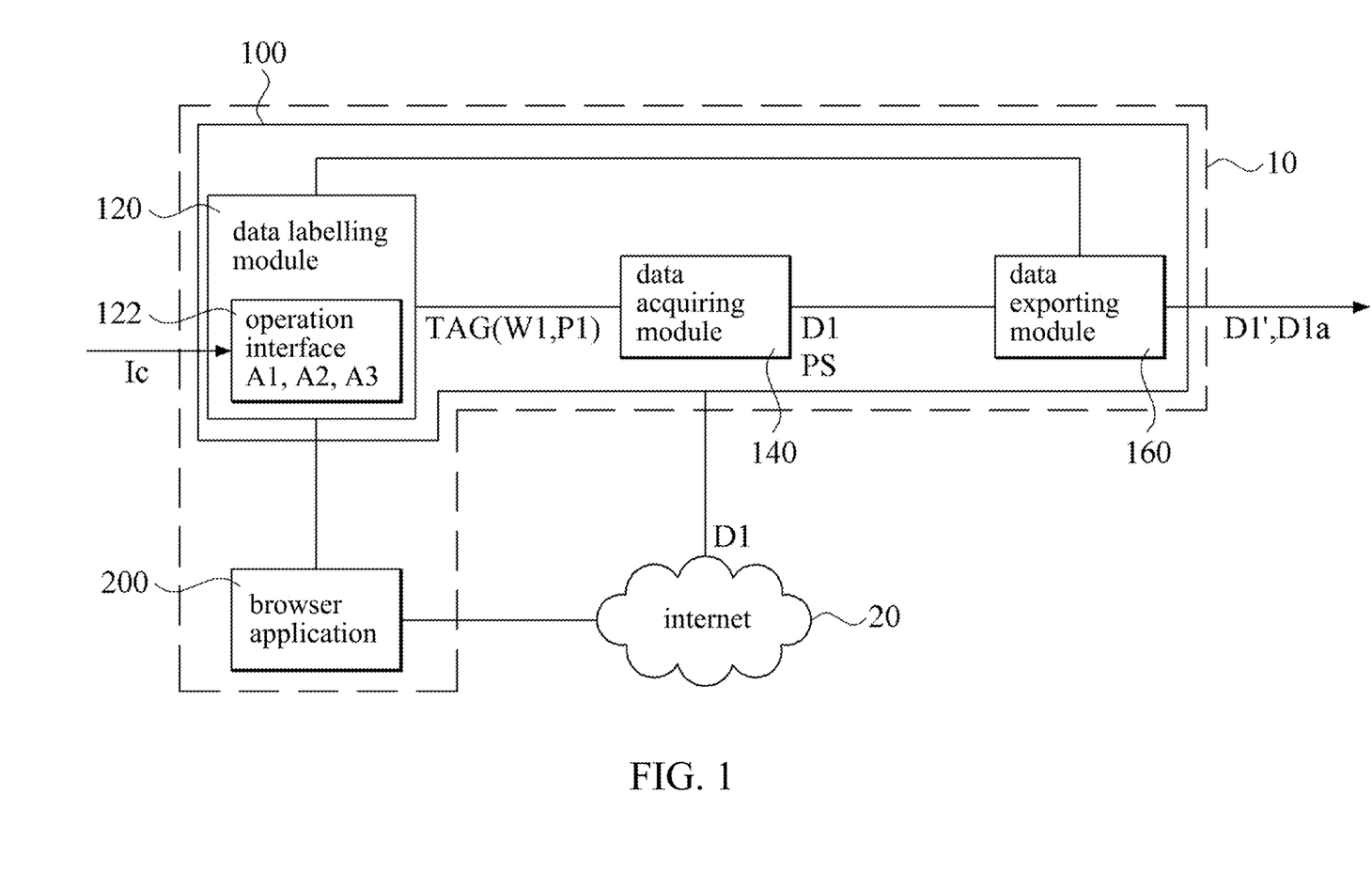
FIG. 1 is a schematic diagram of the architecture of a internet data collection system in one embodiment.

FIG. 1 is a schematic diagram of the architecture of an internet data collection system in one embodiment. As shown, the internet data collection system 100 includes a data labelling module 120, a data acquiring module 140, and a data exporting module 160. The internet data collection system 100 is set on the operating end 10 and connected to the internet 20 to collect data. The internet data collection system 100 is software or a combination of software and hardware. For example, the internet data collection system 100 is implemented by a general programming language or other existing programs, and is installed in a known computer-usable medium. Some modules or functions in the internet data collection system 100 are also implemented by converted into hardware through the production of integrated circuits. The internet data collection system 100 collects internet data such as images, videos, and texts.

The data labelling module 120 provides an operation interface 122 to allow users to label the internet data to generate a collecting instruction Ic. The data labelling module 120 marks the target data D1 as a tag (TAG shown in FIG. 1) and stores it to the operating end 10 according to the collecting instruction Ic. Through the tag, users simply record the collected data without storing a copy to the operating end 10. In one embodiment, the data labelling module 120 obtains the web address W1 (that is, a page link) corresponding to the web page and the location information P1 of the target data D1 on the web page as the tag, to record the target data D1. In one embodiment, the data labelling module 120 performs its functions in conjunction with a browser application 200.

The data acquiring module 140 obtains the tag from the data labelling module 120, and acquires corresponding internet data (that is, the target data D1) according to the tag. In one embodiment, the data acquiring module 140 downloads the internet data pointed to by the web address W1 and the location information P1 of the tag to the operating end 10 or other electronic devices or network locations that are easy for users to access. The operating end 10 is a client end in some embodiment.

The data exporting module 160 is used to organize and export the target data D1 to facilitate users' viewing and utilization. In one embodiment, with the function of the data acquiring module 140, the data exporting module 160 exports a copy data D1' of the target data D1 according to the user's needs, or exports converted data D1a after converting the target data D1 into a required file format.

Figure 2:
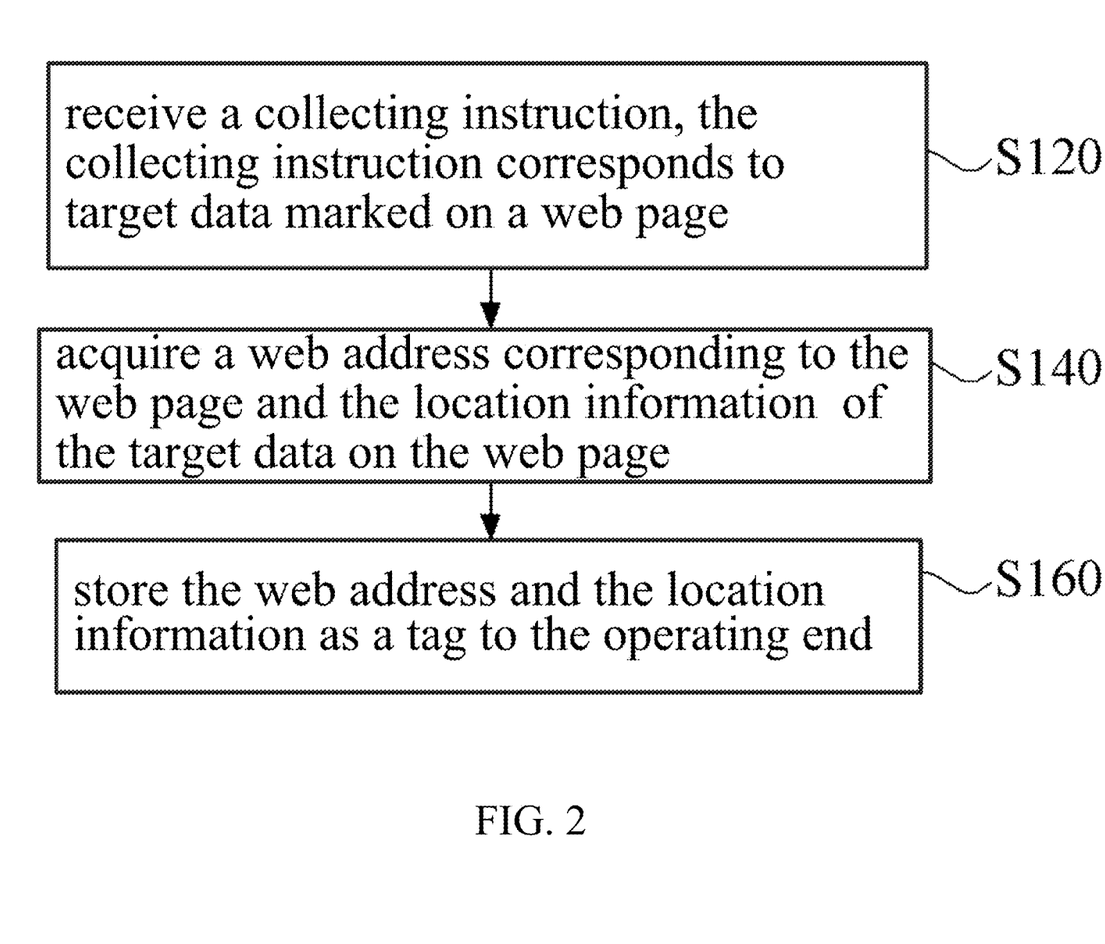
FIG. 2 is a flowchart of an internet data collection method in one embodiment.

FIG. 2 is a flowchart of an internet data collection method in one embodiment. This flowchart mainly corresponds to the operation of the data labelling module 120 in FIG. 1. The internet data collection method includes the following steps.

First, in step S120, receive a collecting instruction Ic. The collecting instruction Ic corresponds to a target data D1 marked on a web page. In one embodiment, in this step, a browser application 200 connects to the internet 2 to present the web page and the target data D1.

Subsequently, in step S140, acquire a web address W1 corresponding to the web page and the location information P1 of the target data on the web page according to the collecting instruction Ic.

Next, in step S160, store the web address W1 and the location information P1 as a tag to the operating end 10.

In one embodiment, the tag also records the type of the target data D1, such as texts, images, and videos. Different data types are recorded using different forms of the location information. In one embodiment, for certain types of internet data, such as images, videos. In order to facilitate the user to view, a thumbnail of the tag is also stored.

In order to allow users to perform labeling, classification, and editing operations, in one embodiment, the operation interface 122 of the data labelling module 120 provides the labelling page, the category page, and the editing page presented on the operating end 10. See FIG. 3 to FIG. 5 for details. The content format of the data that is able to be marked and recorded by the data labelling module 120 is not limited to the text data and the image data, but the video data or audio data and other content formats can also be marked and recorded.

Figure 3:
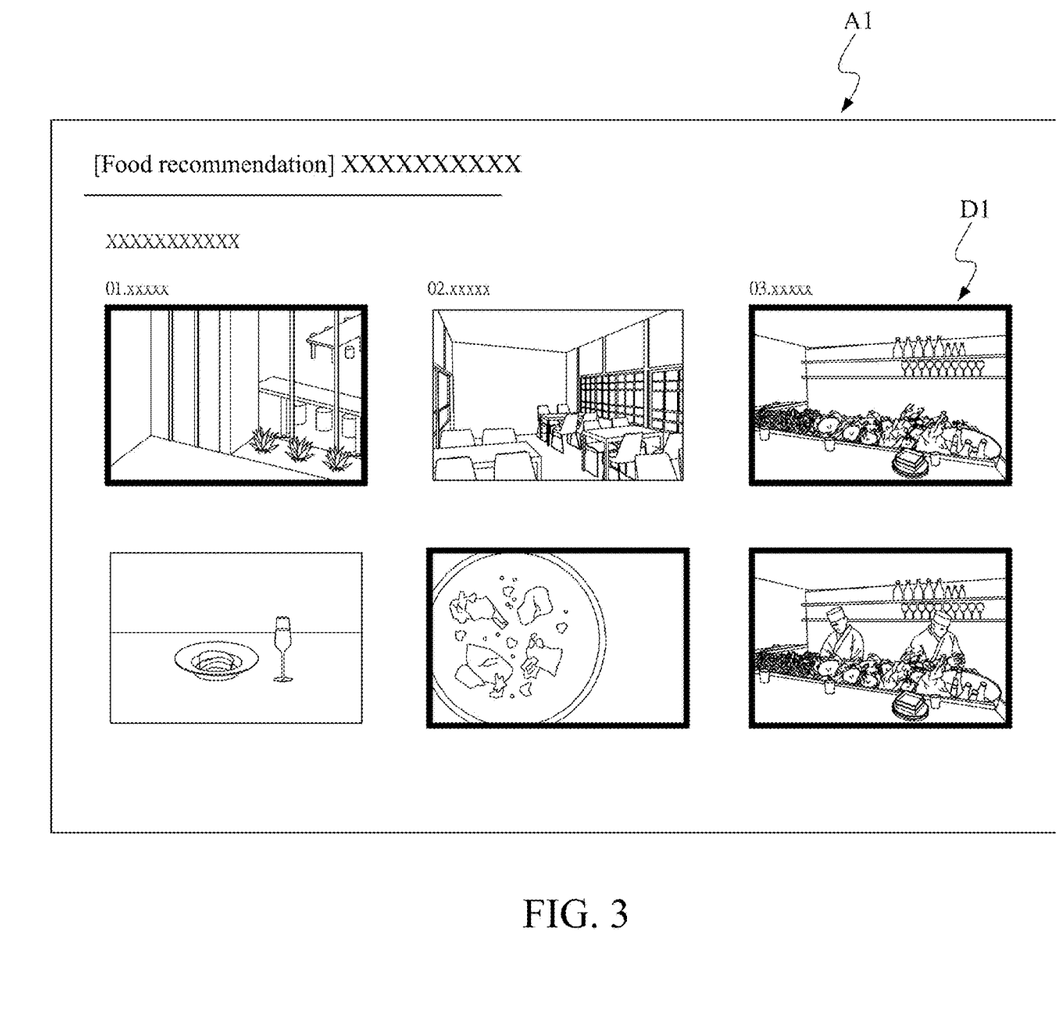
FIG. 3 is a schematic diagram of a labelling page used in the internet data collection method in one embodiment.

FIG. 3 is a schematic diagram of a labelling page A1 used in the internet data collection method in one embodiment. A web page once marked by the user is shown in the figure.

As shown, the labelling page A1 is superimposed on the web page to present the user's labeling mark or prompt display. The image data in the bold frame in the figure is the target data D1 selected by the user. The labelling page A1 also provides users with software tools needed for data labeling. These software tools are displayed directly on the labelling page A1, and are activated by shortcut keys or by clicking the right mouse button to open the menu for selecting. In one embodiment, the labelling page A1 provides a category label for the user to classify the internet data to be collected in advance. In one embodiment, the labelling page A1 also provides an annotation function, allowing the user to make a note or remark when selecting the target data D1 on the web page at the same time.

Secondly, in one embodiment, according to the difference of internet data types, the labelling page A1 provides a plurality of different selecting methods on the web page, such as single-point selection, continuous data selection, or data capture. For example, the image data presented in FIG. 3 is selected by single-point selection. The text data is selected by continuous data selection. When a user wants to directly capture the data and store a copy to the operating end, he can use the data capture function. In one embodiment, the target data D1 includes a labeling mark or prompt display (for example, highlighting or fluorescent display) on the labelling page to remind the user that the data is collected data.

Figure 4:
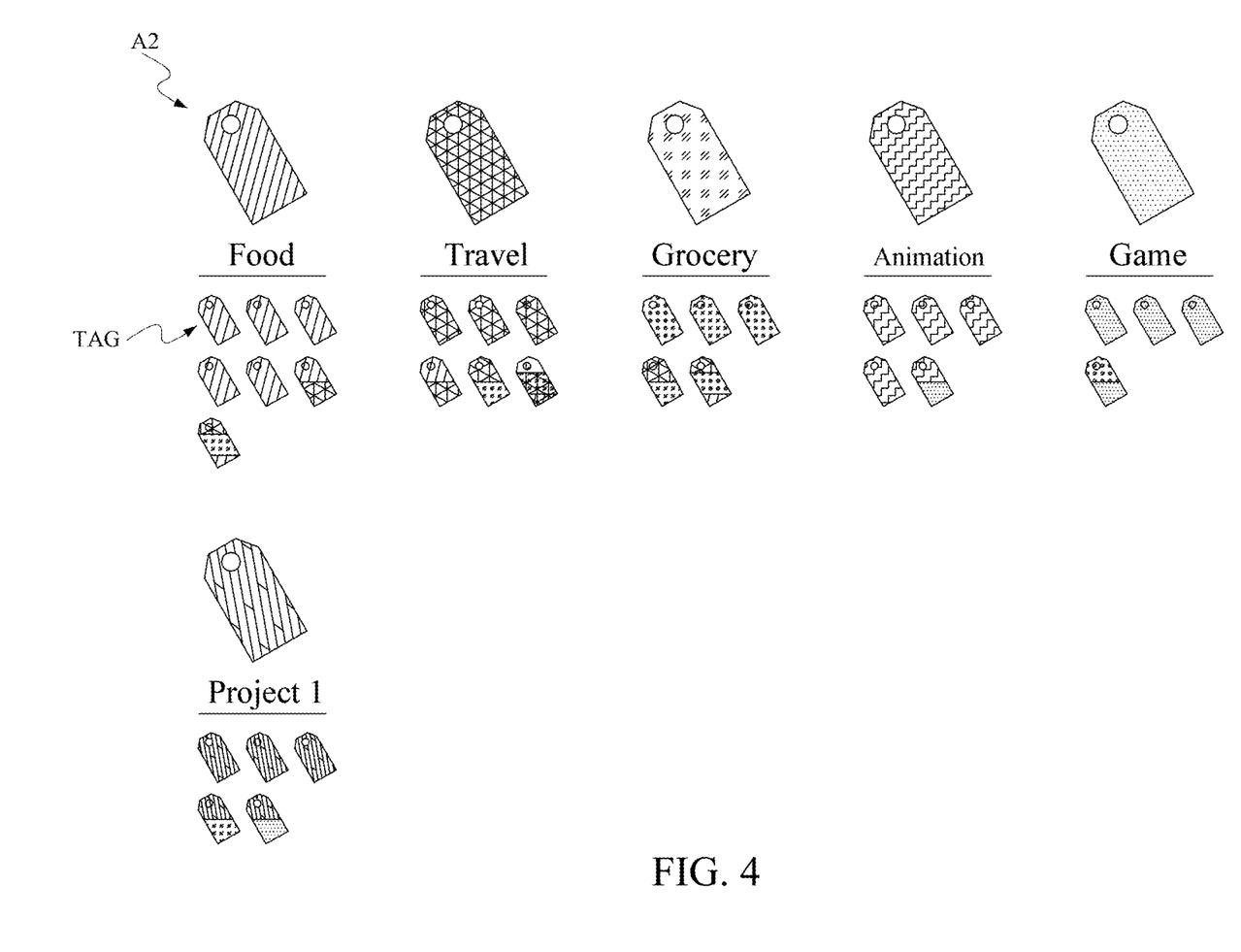
FIG. 4 is a schematic diagram of a category page used in the internet data collection method in one embodiment.

FIG. 4 is a schematic diagram of a category page A2 used in the internet data collection method in one embodiment. As shown, the category page A2 is used to classify and present the recorded tag. For example, the categories of Food, Travel, Grocery, Animation, Game, and Project 1 in the picture are convenient for users to edit and view.

In one embodiment, as shown, the tags are classified by the color of the icons of the tags (different filled graphics in the figure represent different colors), which is not limited herein. In one embodiment, the tags are also classified by the shape of the icons of the tags. As shown, if a tag is classified into multiple categories at the same time, the icons of the tags is divided into multiple color blocks of different colors to be presented. For example, under the Food category, there is a tag that is also classified as Travel and Grocery.

The category page A2 in the figure shows the tags recorded according to the category set by the user, which is not limited herein. In one embodiment, if the user does not set the category, the category page A2 presets the tags marked on the same web page as the tags of the same category for presentation. In one embodiment, the category page A2 presets the tags of the target data D1 of the same data format as the tags of the same category for presentation. In one embodiment, the category page A2 presets the tags marked as being collected on the same day as the tags of the same category for presentation.

Figure 5:
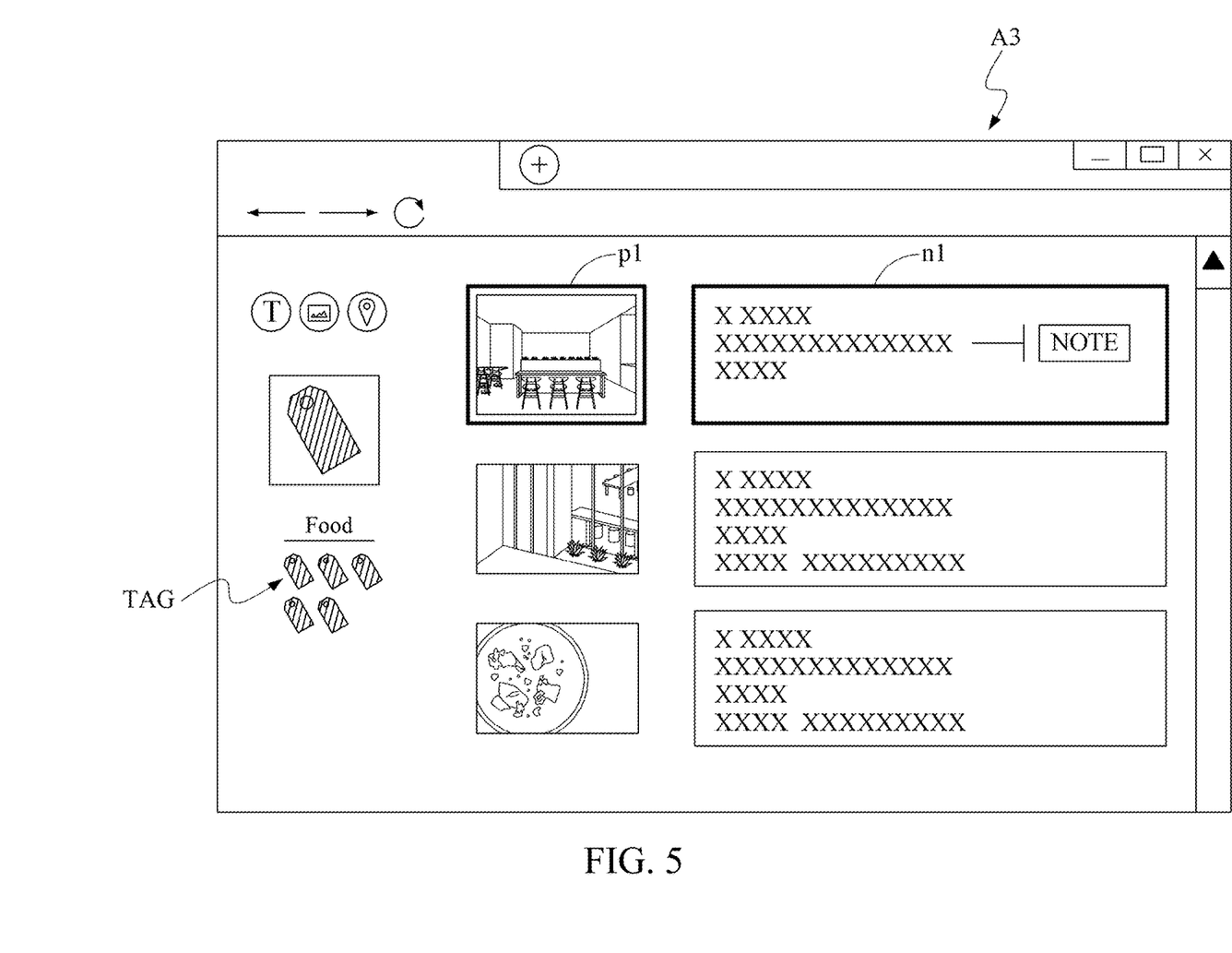
FIG. 5 is a schematic diagram of an editing page used in the internet data collection method in one embodiment.

FIG. 5 is a schematic diagram of an editing page A3 used in the internet data collection method in one embodiment. The editing page A3 allows users to modify the classified tags and each tag itself or the corresponding content. As shown, after the user selects a specific category (such as the Food category in the figure) for editing, the editing page A3 displays the tags and corresponding contents under the specific category (the tags as shown in the figure and corresponding thumbnails p1 and notes n1).

After the user selects the tag that he wants to edit, he modifies the corresponding content of the tag. For example, the user is allowed to modify the notes or annotations corresponding to the tag, the category of the tag, and the naming of the tag. In addition, in one embodiment, the user is also allowed to select the category note on the left side shown in the figure to modify the category name. The operation method of the category modification is implemented by selecting or dragging in one embodiment.

Since the video data includes a certain length of time and its data collection method is relatively special, the following describes an embodiment of a internet data collection method applied to the video data collection.

For network video data, in addition to the video link, the data recorded by the tag also records the screenshot of the video and the corresponding time point, to provide users to view and refer to. These materials are presented in the editing page A3.

Secondly, if the user only wants to select a segment of the video data, in one embodiment, the data collection method selects the interception start point and the intercept end point of a video segment through the labelling page A1, and records these data in the tag. In one embodiment, the data collection method performs the selection or modification of the selection range in the editing page A3. In one embodiment, the screenshot recorded by the tag corresponds to the selected range of the video. For example, take the images of the interception starting point and the intercept end point as screenshots to record.

Figure 6:
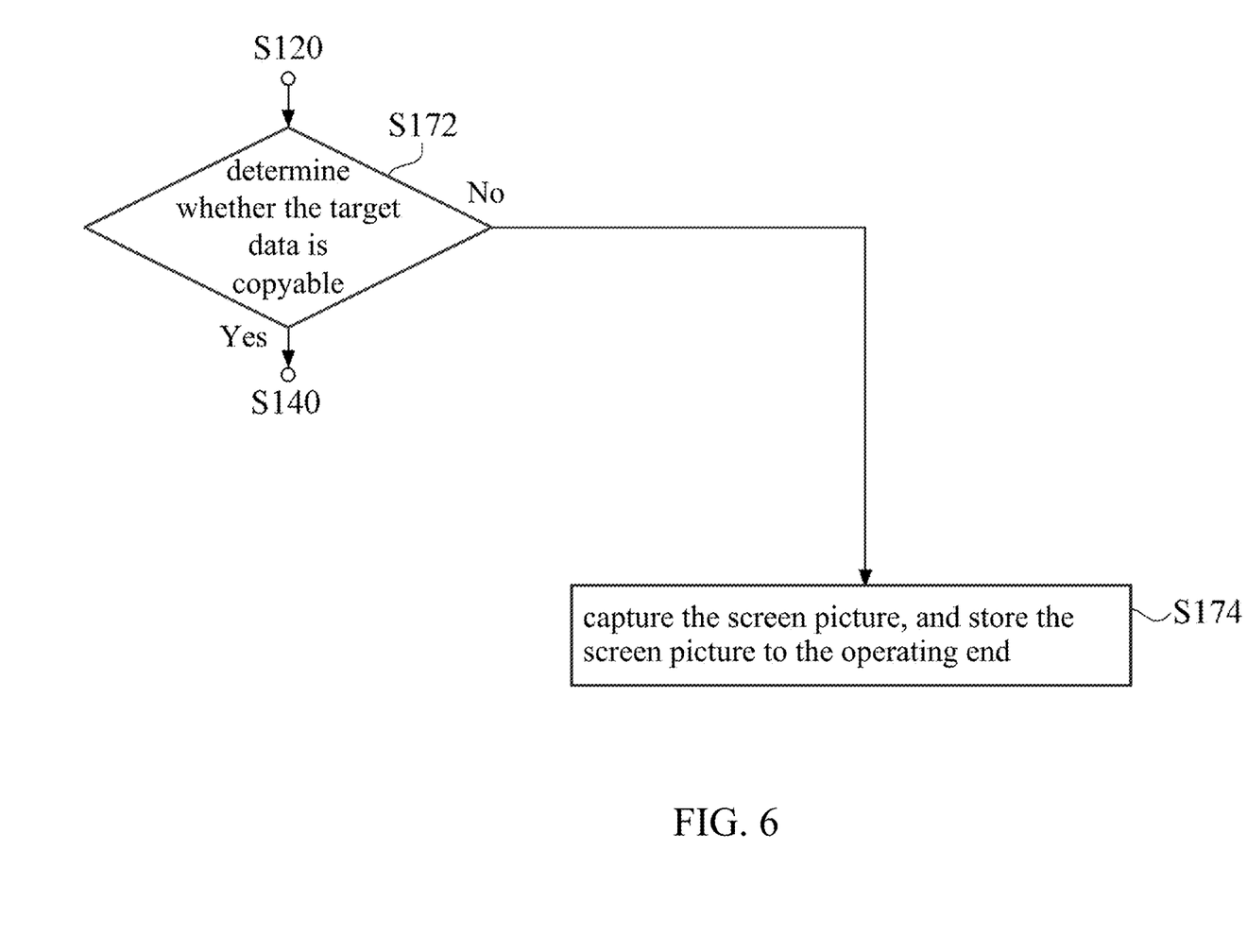
FIG. 6 is a flowchart of the internet data collection method in another embodiment.

FIG. 6 is a flowchart of the internet data collection method in another embodiment. The steps shown in the flowchart follow the step S120 of FIG. 2. This process requires the data labelling module 120 and the data acquiring module 140 of the internet data collection system 100 of FIG. 1 to assist in execution.

Please refer to FIG. 2 together. After the step of receiving the collecting instruction Ic to confirm the target data D1, the process proceeds to a determination step S172 to determine whether the target data D1 is copyable or not.

If Yes, proceed to step S140 to retrieve the location information P1 corresponding to the web address W1 of the web page and the target data D1 on the web page. If No, proceed to step S174 to capture the screen picture PS and store the screen picture PS to the operating end 10 to facilitate collection and use by the user.

In one embodiment, the step S172 and the step S140 are performed by the data labelling module 120 and the browser application 200. The step S174 is performed by the data acquiring module 140.

In one embodiment, the capture object of the screen capture step is preset to be the entire screen, which is not limited herein. In one embodiment, step S174 further presents a capturing range adjustment page for the user to adjust the range to be captured. In addition to capturing the screen through the aforementioned process. In one embodiment, if there is another requirement for screen capture, the screen capture function is also activated by a shortcut key or by opening the menu with the right mouse button and then clicking activation.

Figure 7:
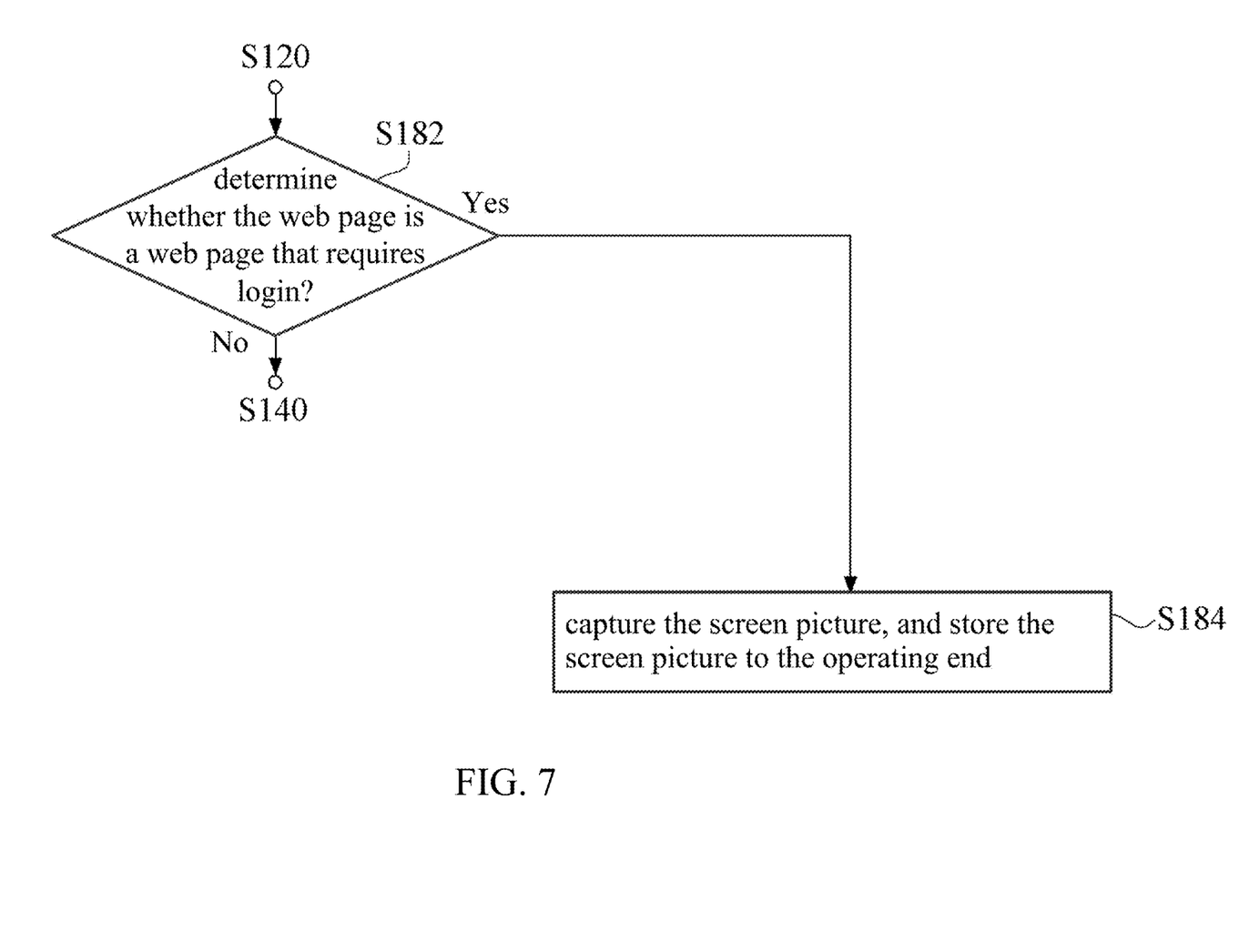
FIG. 7 is a flowchart of the internet data collection method in another embodiment.

FIG. 7 is a flowchart of the internet data collection method in another embodiment. The steps shown in this flowchart follow the step S120 of FIG. 2. This process needs the data labelling module 120 and the data acquiring module 140 of the internet data collection system 100 of FIG. 1 to assist in execution.

As shown, please refer to FIG. 2 together. After the step of receiving the collecting instruction Ic to confirm the target data D1, proceed to step S182 to determine whether the web page is a web page that requires login or not.

If No, proceed to step S140 to retrieve the web address W1 corresponding to the web page, and the location information P1 of the target data D1 on the web page. If Yes, proceed to step S184 to capture the screen picture PS and store the screen picture PS to the operating end 10 to facilitate the collection and use of the user.

In one embodiment, the steps S182 and S140 are performed by the data labelling module 120 in conjunction with the browser application 200. The step S184 is performed by the data acquiring module 140.

Figure 8:
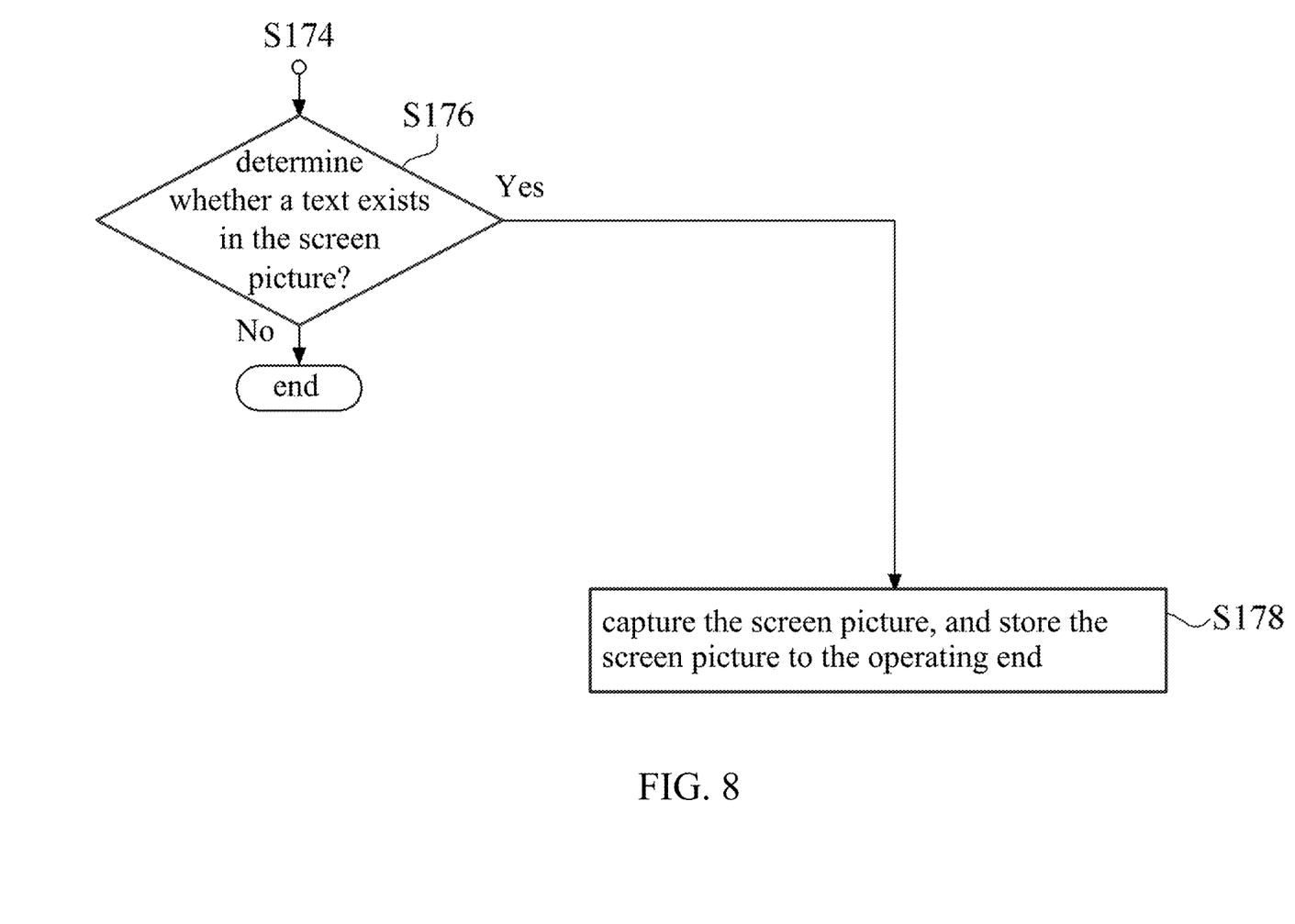
FIG. 8 is a flowchart of the internet data collection method in another embodiment.

FIG. 8 is a flowchart of the internet data collection method in another embodiment. The steps shown in this flowchart follow the step S174 of FIG. 6. This process requires the assistance of the data exporting module 160 of the internet data collection system 100 of FIG. 1 to perform.

As shown, after the screen picture PS is stored, the flow proceeds to a determination step S176 to determine whether a text exists in the screen picture PS or not. If Yes, proceed to step S178 to export the text and generate an editable format of the text to facilitate users to collect and use. If No, the process ends.

Through the internet data collection method provided, users can directly mark the target data they want to collect on the web page, and then automatically record and store them as the tag for users to collect and use. The internet data collection method provides a convenient way and interface for users to classify the data. Moreover, for data that is difficult to retrieve directly through the web page, such as the text of the web page or the text on the image that is restricted from copying, the editable format of the text is generated through screen capture and the text recognition way to facilitate users' collection and use.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An internet data collection method, comprising:
receiving a collecting instruction, the collecting instruction corresponds to target data marked on a web page;
retrieving a web address corresponding to the web page and location information of the target data on the web page; and
storing the web address and the location information as a tag to an operating end,
wherein, after the step of receiving the collecting instruction, the method further comprises:
determining whether the target data is copyable or not;
if the target data is copyable, retrieving the web address corresponding to the web page and the location information of the target data on the web page;
if the target data is not copyable, capturing a screen picture including the target data and storing the screen picture to the operating end.

2. The internet data collection method according to claim 1, wherein, the step of receiving the collecting instruction comprises presenting the web page and the target data through a browser application.

3. The internet data collection method according to claim 1, wherein, the target data is image data, video data, or text data.

4. The internet data collection method according to claim 1, wherein, the tag is a category label, and the category label classifies the target data by color or shape.

5. The internet data collection method according to claim 4, wherein, tags marked on the same web page are preset as the same category.

6. The internet data collection method according to claim 4, wherein, tags classifying the target data of the same data format are preset as the same category.

7. The internet data collection method according to claim 1, wherein, if the target data is video data, the tag includes an intercept starting point and an intercept end point of the video data.

8. The internet data collection method according to claim 1, after storing the screen picture, further comprising:
analyzing whether a text exists in the screen picture;
if there exists the text in the screen picture, exporting the text and generating an editable format of the text.

9. An internet data collection method, comprising:
receiving a collecting instruction, the collecting instruction corresponds to target data marked on a web page;
retrieving a web address corresponding to the web page and location information of the target data on the web page; and
storing the web address and the location information as a tag to an operating end,
wherein, after the step of receiving the collecting instruction, the method further comprises:
determining whether the web page requires login or not;
if the web page does not require login, retrieving the web address corresponding to the web page and the location information of the target data on the web page;

if the web page requires login, capturing a screen picture including the target data and storing the screen picture to the operating end.

10. The internet data collection method according to claim 9, after storing the screen picture, further comprising:
analyzing whether a text exists in the screen picture;
if there exists the text in the screen picture, exporting the text and generating an editable format of the text.

11. An internet data collection method, comprising:
receiving a collecting instruction, the collecting instruction corresponds to target data marked on a web page;
retrieving a web address corresponding to the web page and location information of the target data on the web page; and
storing the web address and the location information as a tag to an operating end,
wherein, after the step of storing the tag to an operating end, method further comprises:
generating a category page and an editing page based on the tag and presenting the category page and the editing page on the operating end.

* * * * *